(12) United States Patent
Tabassi et al.

(10) Patent No.: US 7,988,445 B2
(45) Date of Patent: Aug. 2, 2011

(54) INJECTION MOLDING APPARATUS HAVING A NOZZLE TIP COMPONENT FOR TAKING A NOZZLE OUT-OF-SERVICE

(75) Inventors: Payman Tabassi, Rockwood (CA); Denis Babin, Georgetown (CA); Rhonda Goslinski, Guelph (CA); Scott Gammon, Toronto (CA)

(73) Assignee: Mold-Masters (2077) Limited, Georgetown, ON (CA)

( * ) Notice: Subject to any disclaimer, the term of this patent is extended or adjusted under 35 U.S.C. 154(b) by 4 days.

(21) Appl. No.: 12/555,111

(22) Filed: Sep. 8, 2009

(65) Prior Publication Data

US 2010/0047383 A1    Feb. 25, 2010

Related U.S. Application Data

(63) Continuation-in-part of application No. 12/196,267, filed on Aug. 21, 2008, now abandoned.

(51) Int. Cl.
*B29C 45/23* (2006.01)

(52) U.S. Cl. .................................. 425/564; 425/566
(58) Field of Classification Search .................. 425/562, 425/563, 564, 565, 566
See application file for complete search history.

(56) References Cited

U.S. PATENT DOCUMENTS

| | | | |
|---|---|---|---|
| 3,571,856 A | 3/1971 | Voelker | |
| 7,022,278 B2 | 4/2006 | Colonico | |
| 7,029,268 B2 | 4/2006 | Doyle et al. | |
| 7,048,532 B2 | 5/2006 | Tabassi | |
| 7,210,922 B1 | 5/2007 | Kohler | |
| 7,722,351 B2 * | 5/2010 | Feick et al. | 425/564 |

* cited by examiner

*Primary Examiner* — Tim Heitbrink
(74) *Attorney, Agent, or Firm* — Medler Ferro PLLC

(57) ABSTRACT

An injection molding apparatus includes a plurality of valve-gated nozzles, each nozzle having a respective valve pin that is actuated by an actuator. A nozzle tip component for taking one of the valve-gated nozzles of the injection molding apparatus out-of service, wherein the nozzle tip component has a surface that grips the respective valve pin to lock the valve pin in an out-of-service position thereby preventing flow of molding material into an associated mold cavity and causing disengagement of the valve pin from the actuator.

17 Claims, 12 Drawing Sheets

INJECTION MOLDING APPARATUS HAVING A NOZZLE TIP COMPONENT FOR TAKING A NOZZLE OUT-OF-SERVICE

CROSS-REFERENCE TO RELATED APPLICATION

This application is a continuation-in-part of U.S. application Ser. No. 12/196,267, filed Aug. 21, 2008, now abandoned which is incorporated by reference herein in its entirety.

BACKGROUND OF THE INVENTION

1. Field of the Invention

This invention relates to an injection molding apparatus, and more particularly, an injection molding apparatus having a valve pin.

2. Related Art

Injection molding apparatuses, such as hot halves and hot runners, commonly use valve pins to control flow of molding material.

When a cavity, valve pin, heater, mold gate, or other related component wears or fails, the molded product may have defects and the injection molding apparatus may have to be shut down for maintenance or repair. Such downtime eats into production time, which is nearly always sought to be maximized.

SUMMARY OF THE INVENTION

An injection molding apparatus, such as a hot half or hot runner, includes an actuated valve pin plate, a manifold defining a manifold channel, a plurality of nozzles defining nozzle channels in communication with the manifold, each nozzle associated with a mold gate, and a plurality of valve pins releasably coupled to the actuated valve pin plate. Each valve pin extends through the one of the nozzles for controlling flow of molding material in the nozzle channel. The actuated valve pin plate is operable to move the plurality of valve pins between open and closed positions of the mold gates. At least one nozzle includes a nozzle tip component having a tapered interior surface that circumferentially surrounds and grips the associated valve pin to lock the valve pin in the closed position and prevent flow of molding material.

BRIEF DESCRIPTION OF THE FIGURES

Embodiments of the present invention will now be described more fully with reference to the accompanying drawings. The drawings are not to scale.

DETAILED DESCRIPTION OF THE INVENTION

Figure 1:
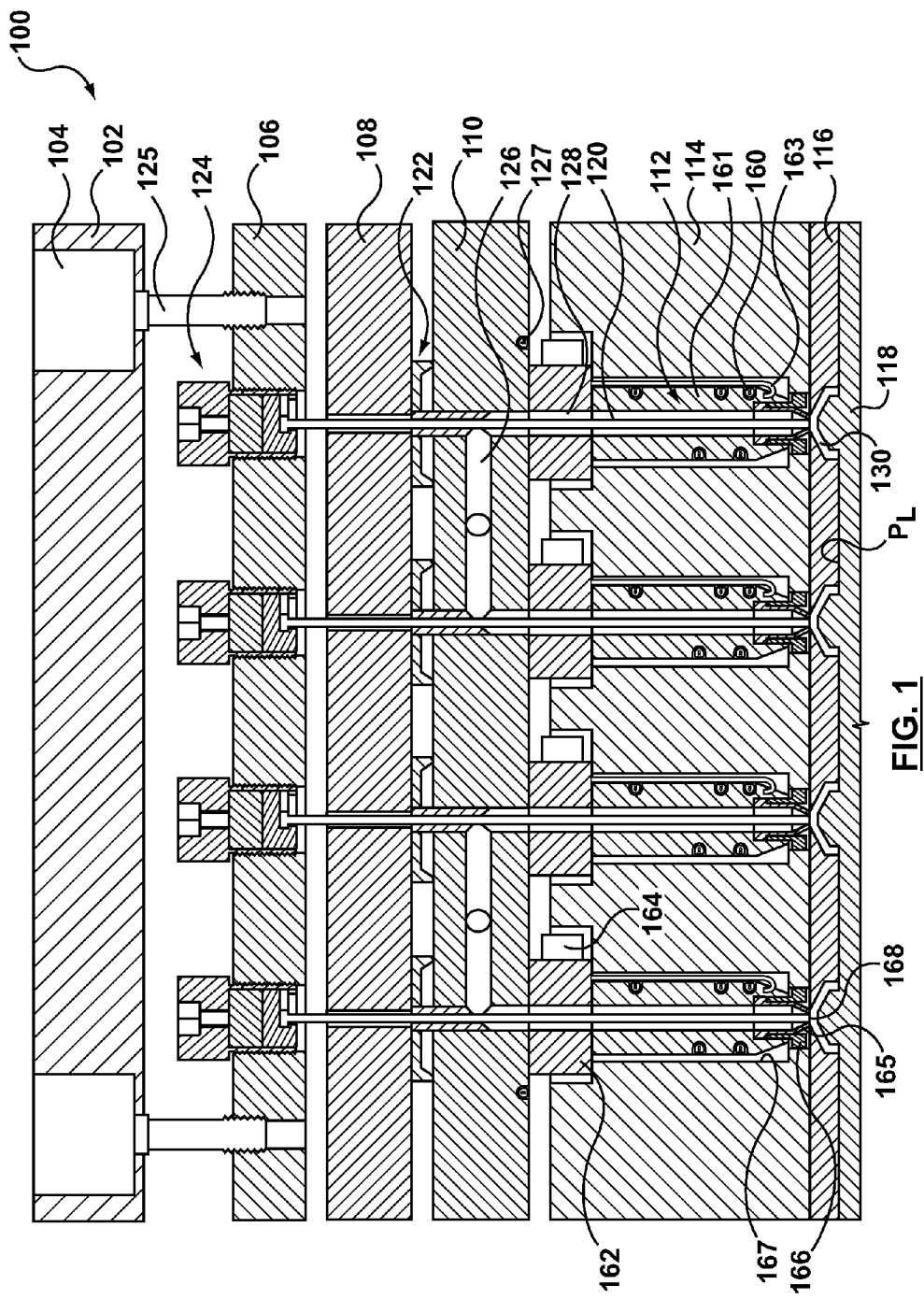
FIG. 1 is a cross-sectional view of an injection molding apparatus according to an embodiment of the present invention.

FIG. 1 shows an injection molding apparatus 100 according to an embodiment of the present invention. The features and aspects described for the other embodiments can be used accordingly with the present embodiment.

The injection molding apparatus includes an actuator plate 102, actuators 104, an actuated valve pin plate 106, a back plate 108, a manifold 110, nozzles 112, a mold plate 114, a cavity plate 116, a core plate 118, valve pins 120, valve pin bushings 122, and magnetic couplings 124. The injection molding apparatus 100 can include any number of manifolds and nozzles, in any configuration. In this embodiment, one manifold is shown for simplicity. The injection molding apparatus 100 can include additional components, such as mold plates, alignment dowels, mold gate inserts, and cooling channels, among others.

The actuator plate 102 has openings for accommodating the actuators 104. If the actuators 104 depend on a working fluid for operation, i.e., pneumatic or hydraulic types, fluid conduits can be provided in the actuator plate 102. Should the actuators 104 be electric or magnetic or of some other design, electrical conduits can be provided.

The actuators 104 are disposed in the actuator plate 102 and can be pneumatic, hydraulic, electric, magnetic, or of some other design. The actuators 104 can translate the valve pin plate 106 by linear motion, e.g., a pneumatic piston or rotary motion, e.g., an electric screw drive. To accomplish this, each actuator 104 has a stationary part, e.g., a housing or cylinder, connected to the actuator plate 102 and has a movable part 125, e.g., a piston, connected to the valve pin plate 106. The number of actuators is a design choice, and in other embodiments more or fewer actuators can be used. Any style of actuator is suitable, provided that it can move the valve pin plate 106 and the valve pins 120.

The valve pin plate 106 is connected to the movable part 125 of each actuator 104. The valve pin plate 106 has a plurality of threaded openings for receiving the magnetic couplings 124. The valve pin plate 106 moves in an axial longitudinal direction toward and away from manifold 110 in response to the actuation of the actuators 104. The valve pin plate 106 need not be a plate as such, but can be any rigid member capable of connecting one or more actuators to a plurality of magnetic couplings and their respective valve pins 120. In other embodiments, the valve pin plate 106 is an assembly of stacked plates.

The back plate 108 is disposed between the valve pin plate 106 and the valve pin bushings 122 and serves to secure the valve pin bushings 122 against the manifold 110. The back plate 108 has several bores through which the valve pins 120 extend.

The manifold 110 defines a manifold channel 126 and includes a manifold heater 127. The manifold channel 126 receives molding material, e.g., plastic melt, from an inlet component (not shown) or an upstream manifold (not shown). The manifold heater 127 can be of any design, such as the insulated resistance wire illustrated. It should also be mentioned that, because of the plate interconnections (not shown), the manifold 110 is stationary in the actuation direction, i.e., fixed in a longitudinal direction, relative to the stationary parts of the actuators 104.

The nozzles 112 are connected to the manifold 110 and each nozzle 112 defines one of a plurality of nozzle channels 128 in fluid communication with the manifold channel 126. In this embodiment, each nozzle 112 includes a nozzle body 161, a nozzle flange 162, a nozzle heater 160 embedded in the nozzle body, a thermocouple 163, a terminal end 164 for connecting the heater to a power source, a nozzle tip 165 of a thermally conductive material, and a tip retainer 166 of a less thermally conductive material than nozzle tip 165. The nozzles 112 in combination with the manifold 110 define a hot runner.

The mold plate 114 has wells 167 to accommodate and support the nozzles 112. The wells 167 are sized to thermally insulate the nozzles 112 from the surrounding material.

The cavity plate 116 and the core plate 118 define mold cavities 130, and the cavity plate 116 defines mold gates 168 leading to the mold cavities 130. The cavity plate 116 and core plate 118 are separable along a parting line $P_L$ to allow ejection of molded products from the mold cavities 130. In other embodiments, a single cavity can be fed molding material by several nozzles 112.

Each of the valve pins 120 extends from one of the magnetic couplings 124 through a respective nozzle 112 for controlling flow of molding material through the respective mold gate 168 and into the respective mold cavity 130.

Each valve pin bushing 122 is held to the manifold 110 by the back plate 108. Each valve pin bushing 122 includes a disc-shaped main body and a cylindrical bushing portion connected to and extending from the main body and into the manifold 110. Each valve pin bushing 122 has a valve pin bore, which creates a seal with the valve pin 120 while still allowing the valve pin 120 to slide.

Each magnetic coupling 124 couples a respective valve pin 120 to the valve pin plate 106 and allows decoupling of the respective valve pin 120 from valve pin plate 106. Each magnetic coupling 124 directly transmits actuator closing force to the respective valve pin 120 when the valve pins 120 are being closed, for e.g., moved towards the mold gate 168. Each magnetic coupling 124 also applies a magnetic force to couple valve pins 120 to the valve pin plate 106 in order to transmit actuator opening force to the respective valve pin 120 when the valve pins 120 are being opened, for e.g., moved away from the mold gate 168. During normal operation, the magnetic force is sufficient to keep the valve pins 120 coupled to the valve pin plate 106 when the valve pins 120 are opened and closed. If the respective magnetic force is overcome by an actuator opening force such that a valve pin becomes immovable, the valve pin plate 106 and remaining valve pins 120 continue to move together. The magnetic couplings 124 are described in more detail below. Further, the magnetic couplings 124 are described in more detail in U.S. Patent Application Publication No. 2009/0102099, which is herein incorporated by reference in its entirety.

Figure 2:
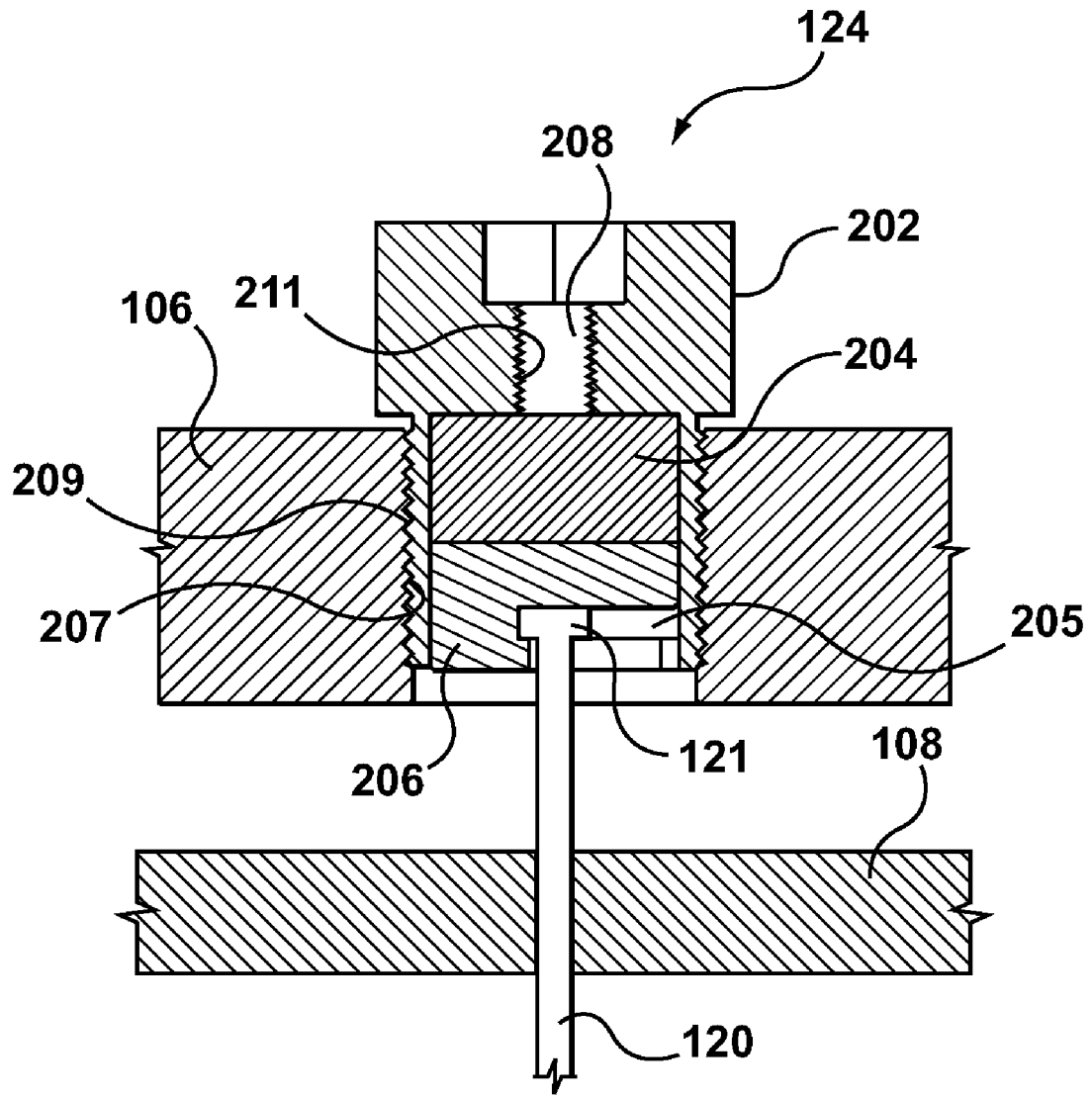
FIG. 2 is a cross-sectional view of one of the magnetic couplings of FIG. 1.

FIG. 2 is a cross-sectional view of one of the magnetic couplings 124. The magnetic coupling 124 includes a housing 202, a first magnetic part 204, and a second magnetic part 206. The housing 202 connects the first magnetic part 204 to the valve pin plate 106. The housing 202 includes threads 209 threaded into a threaded bore 207 of the valve pin plate 106. A second bore 208, which may also include threads 211, is provided through housing 202 to be in communication with threaded bore 207.

The first magnetic part 204 is connected to the valve pin plate 106 via the housing 202 and thus moves with the valve pin plate 106. The first magnetic part 204 is inserted into the housing 202 and fixed to the housing 202 by way of magnetic attraction when the housing 202 is made of a magnetically responsive material such as steel. If the housing 202 is not made of a magnetically responsive material or if additional fixing force is required, an adhesive or a tight friction fit can be used, for example. A tool (not shown) can be inserted or threaded into the bore 208 of the housing 202 to push the first magnetic part 204 free from the housing 202.

The second magnetic part 206 is positioned in a direction toward back plate 108 relative to the first magnetic part 204 and close enough to establish a magnetic force with the first magnetic part 204. In this embodiment, the second magnetic part 206 is attractively aligned with the first magnetic part 204 and the resulting the magnetic force is an attractive magnetic force. The second magnetic part 206 is slidable in the housing 202 and is thus moveable with respect to the first magnetic part 204. The second magnetic part 206 has a T-shaped slot 205 for receiving a head 121 of the valve pin 120, so that the second magnetic part 206 and the valve pin 120 are connected and can move together. By way of its location, the first magnetic part 204 defines a stopped position of the second magnetic part 206 relative to the first magnetic part 204 and thus to the valve pin plate 106, and the attractive magnetic force tends to force the second magnetic part 206 into the stopped position. When the second magnetic part 206 is pulled away from the first magnetic part 204, the attractive magnetic force tends to pull the second magnetic part 206 back towards the first magnetic part 204 and into the stopped position.

In one embodiment, the first magnetic part 204 is a permanent magnet, such as a neodymium magnet or a samarium-cobalt magnet, and the second magnetic part 206 includes magnetically responsive material, such as steel, iron, or similar. The choice between a neodymium magnet, a samarium-cobalt magnet, and a magnet of some other material should be made addressing concerns such as temperature exposure and impact during operation. Magnetically responsive material can be ferromagnetic, ferrous material, or any other kind of material that experiences a significant force in the presence of a magnetic field. In this embodiment, the second magnetic part 206 is made of steel. In other embodiments, the first magnetic part 204 can be of a magnetically responsive material and the second magnetic part 206 can be a permanent magnet, or both parts 204, 206 can be some combination of permanent magnets and electromagnets. It should be noted that embodiments of the valve pin plate injection molding apparatuses described herein may include alternate designs than magnetic couplings 124 for coupling and allowing decoupling of a respective valve pin 120 with/from the valve pin plate 106. For example, the injection molding apparatus may include spring couplings such as those described in U.S. Pat. No. 7,210,922, herein incorporated by reference, rather than magnetic couplings 124.

Figure 3:
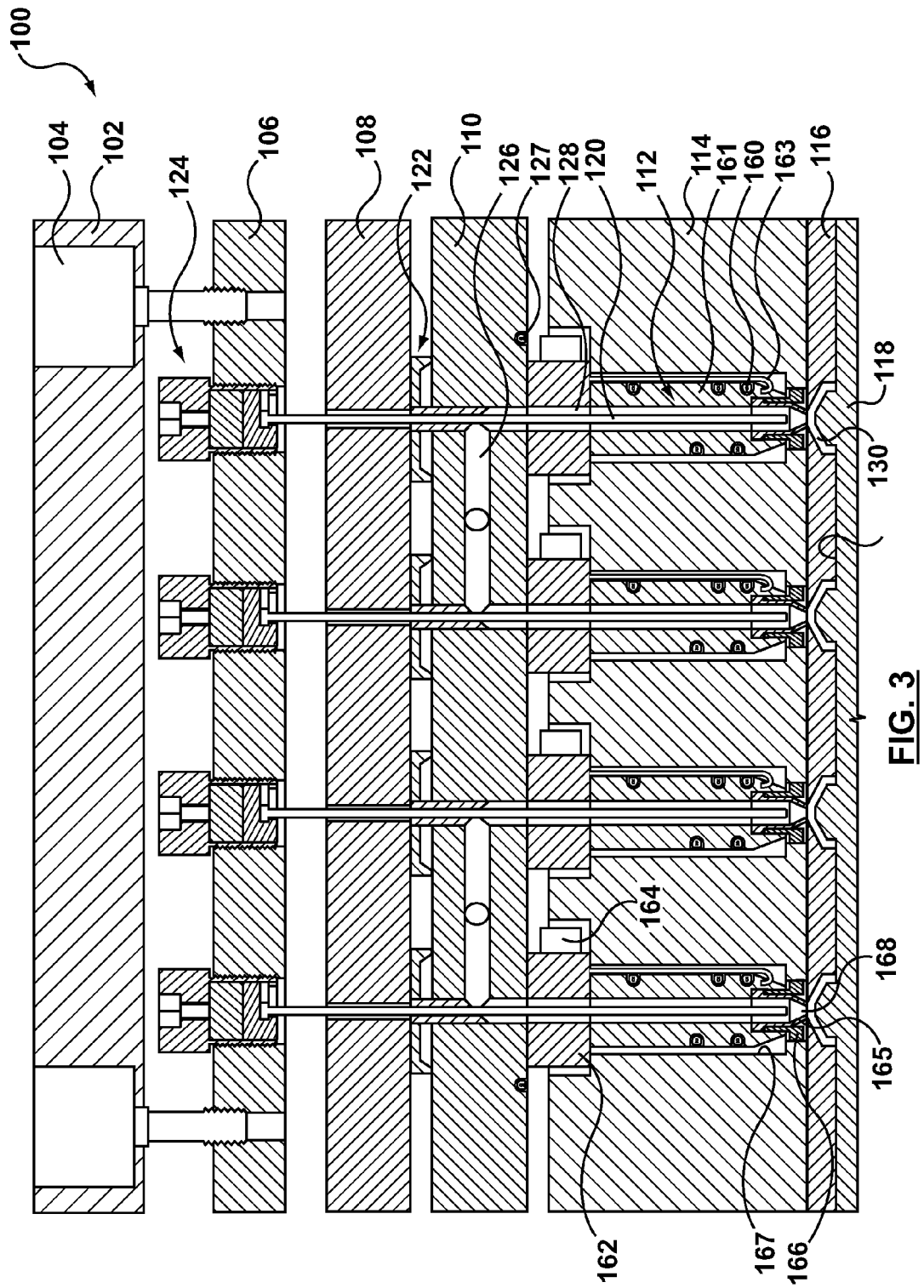
FIG. 3 is the injection molding apparatus of FIG. 1 showing the valve pins in their opened positions.

In FIG. 1 the valve pins 120 are in their closed positions, such that molding material is prevented from flowing through the mold gates 168 and into the mold cavities 130. FIG. 3, on the other hand, shows the valve pins 120 in their opened positions, such that molding material can flow through the mold gates 168 and into the mold cavities 130. As can be seen in FIG. 3, the actuators 104 have moved the valve pin plate 106 in a direction away from mold gates 168 thereby moving the magnetic couplings 124, which, by way of attractive magnetic forces pull the valve pins 120 in a direction away from mold gates 168. When the valve pins 120 are to be returned to their closed positions shown in FIG. 1, the valve pin plate 106 moves in a direction toward mold gates 168, which causes the magnetic couplings 124 to rigidly, i.e., independently of magnetic forces, push the valve pins 120 in a direction toward mold gates 168.

As described in U.S. Patent Application Publication No. 2009/0102099, solidified molding material may be utilized to hold a valve pin associated with an out-of-service nozzle in a closed position. More particularly, the nozzle heater may be shut down such that solidified or cooled molding material immobilizes the valve pin. That is, when a nozzle is to be taken out-of-service, for e.g., because of a worn valve pin or damaged cavity, the nozzle's heater can be shut down to stop molding material from flowing. Solidified molding material can also occur if a nozzle heater fails. The magnetic couplings 124 are designed to have a magnetic force less than the expected immobilizing force of the hardened melt, such that the magnetic couplings 124 will allow for continued operation of the remaining valve pins/nozzles when one or more valve pins/nozzles are taken out-of-service. Shutting down the nozzle's heater also helps to prevent drooling in the out-of-service nozzle. "Out-of-service" means the nozzle is no longer in use to direct melt to its respective mold cavity because the valve pin closes or otherwise blocks the mold gate such that the respective mold cavity is not used in subsequent injection molding cycles.

However, in some applications, the solidified melt around the valve pin may not be sufficient to completely immobilize the out-of-service valve pin such that it is prevented from moving with the other valve pins because the magnetic force of the magnetic couplings 124, or other attractive force if magnetic couplings 124 are not present, is greater than the immobilizing force. In some instances, heat elsewhere in the apparatus may prevent the melt from sufficiently solidifying. Further, taking the valve pin out-of-service by solidified melt causes a small force on the valve pin plate 106 as the immobilizing force of the melt overcomes the magnetic force between the plate and the valve pins. If several valve pins are out-of-service, this small force is multiplied and may damage the magnets of the magnetic couplings.

Thus, in addition to turning off the nozzle heater in order to immobilize the out-of-service valve pin, the present invention is directed to embodiments of a nozzle tip component that may be installed for taking a nozzle of an injection molding apparatus out-of-service. Embodiments of the present invention include a retainer and/or a locking liner at the nozzle tip area that grips a valve pin associated with the nozzle selected to be taken out-of-service in order to maintain the valve pin in a closed or out-of-service position. The retainer can also have a seal portion to prevent leakage past the nozzle tip area and into the well.

Figure 4:
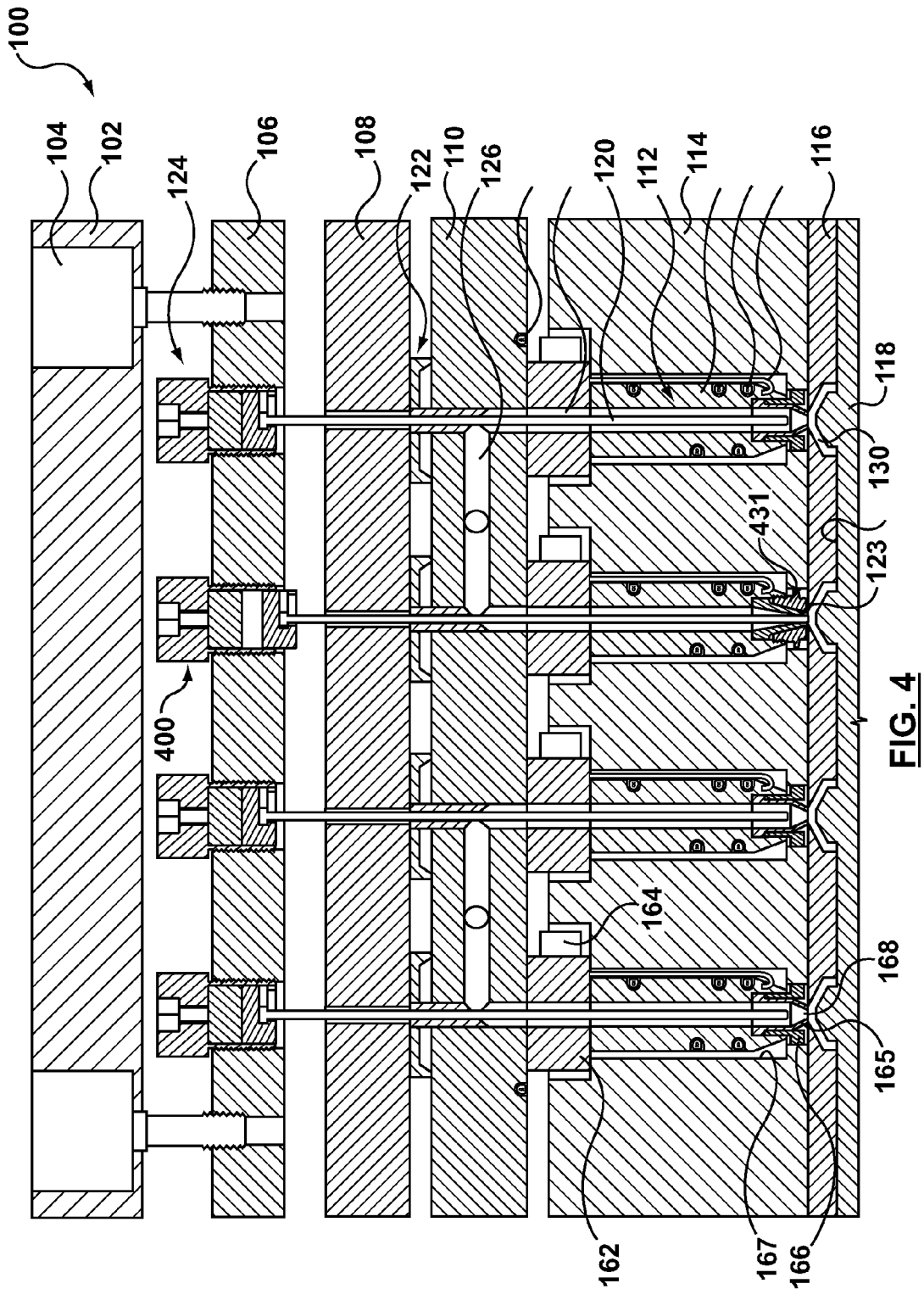
FIG. 4 is the injection molding apparatus of FIG. 1 showing one of the valve pins immobilized.

Turning now to FIG. 4, a cross-sectional view is shown in which one of nozzles 112 at drop 400 has been taken out-of-service by immobilizing the associated valve pin 120 via a nozzle tip component 431. Valve pin 120 has become immovable because it is held in the closed or out-of-service position by an immobilizing force. As can be seen, three of the valve pins 120 are moved away from mold gates 168, as pulled by the valve pin plate 106 via the magnetic couplings 124; while one valve pin 120 at drop 400 is in a closed or out-of-service position, despite the pull of the valve pin plate 106 by the valve pin actuators 104. As shown, the magnetic coupling 124 connected to the out-of-service valve pin 120 reacts to the immobilizing force by permitting valve pin 120 to disengage from the valve pin plate 106 and thereby be prevented from movement therewith.

Figure 6:
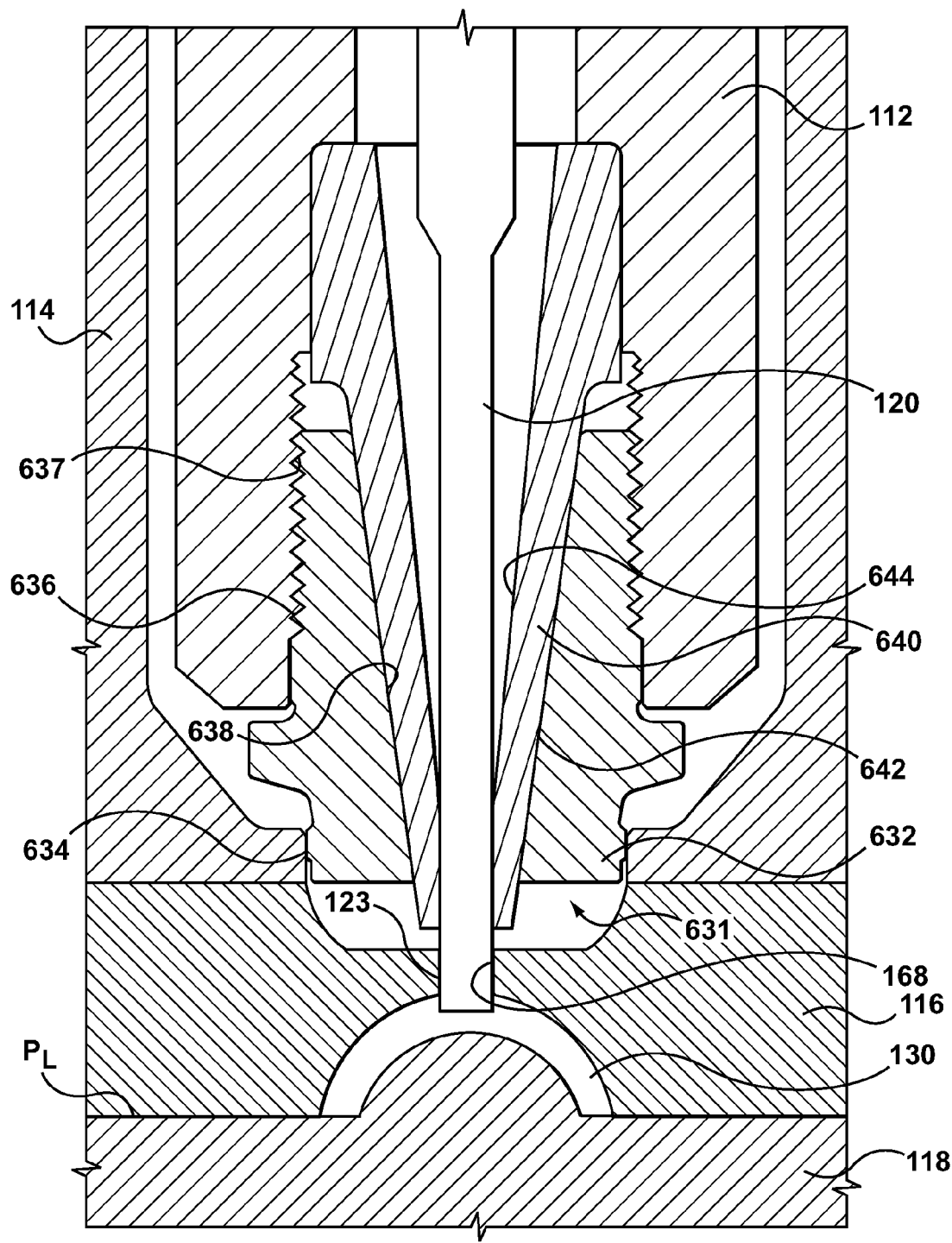
FIG. 6 is a cross-sectional view of a nozzle tip component in accordance with an embodiment hereof.

A selected nozzle 112 can be taken out-of-service by moving the respective valve pin 120 toward or into the associated mold gate 168, removing the nozzle tip 165 and tip retainer 166 that is utilized when the nozzle 112 is in-service, and installing nozzle tip component 431. In an embodiment, nozzle tip 165 and tip retainer 166 may be a one-piece nozzle tip that is directly secured to nozzle 112 such as nozzle tip 1065 shown in FIG. 10. When a nozzle 112 is to be taken out-of-service, a nozzle tip component 431 may be installed to grip at least a tip portion 123 of valve pin 120 in order to maintain valve pin 120 in an out-of-service position wherein valve pin 120 is decoupled from actuated valve pin plate 106 to be prevented from moving therewith. The nozzle tip component 431 creates a pre-determined out-of-service position that prevents unwanted travel of valve pin 120 in an out-of-service nozzle 112, because such unwanted travel may damage the magnets in the magnetic couplings 124. More particularly as shown in the embodiment of FIG. 6, tip portion 123 of the out-of-service valve pin 120 may be pulled through mold gate 168 and further into mold cavity 130 than usual such that when nozzle tip component 631 is installed, valve pin 120 completely disengages second magnet part 206 of the magnetic coupling 124 from first magnetic part 204 of the magnetic coupling 124 to further reduce the possibility of damaging the magnet contact surfaces. Once the selected valve pin 120 is immobilized, the magnetic couplings 124 allow the valve pin plate 106 to still actuate the remaining in-service valve pins 120. The injection molding apparatus 100 can be restarted as usual, and the selected valve pin 120 of the immobilized nozzle will remain stationary.

Figure 5:
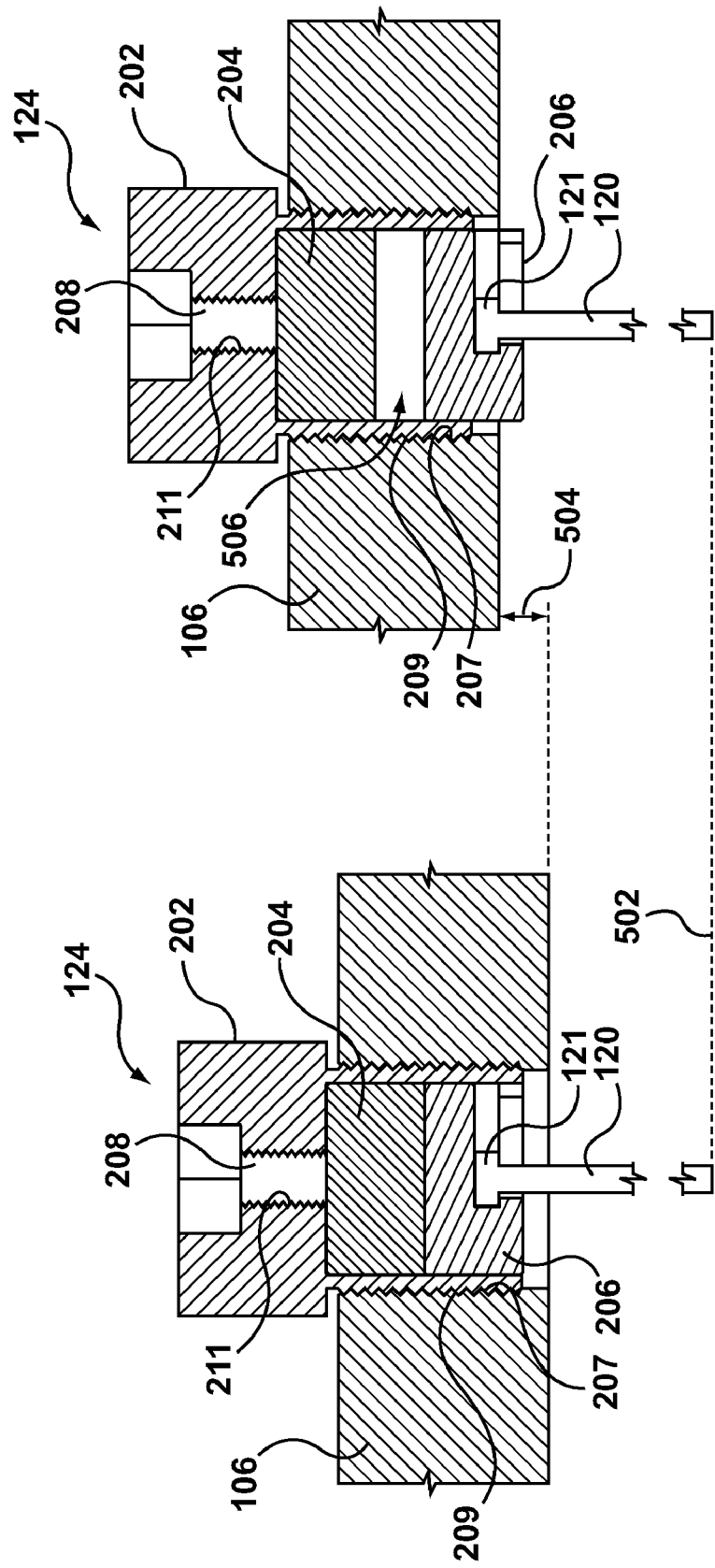
FIGS. 5A and 5B are cross-sectional views of one of the magnetic couplings of FIG. 1 shown in various positions.

FIGS. 5A and 5B show a magnetic coupling 124 associated with an immobilized valve pin 120. FIG. 5A shows the valve pin plate 106 moved toward back plate 108 and the manifold (not shown) such that valve pin 120 is seated within mold gate 168 as shown at drop 400 in FIG. 4, while FIG. 5B shows the valve pin plate 106 moved away from back plate 108 and the manifold (not shown) such that the valve pin 120 is in an out-of-service position as shown at drop 400 in FIG. 4. As indicated at line 502, the valve pin 120 stays in the closed position even though the valve pin plate 106 has moved upwards by a distance 504 (which, in this embodiment, is equivalent to the valve pin travel). Second magnetic part 206 remains stationary with the immobilized valve pin 120. Viewed with the valve pin plate 106 taken as a reference, the second magnetic part 206 is maintained within the housing 202 away or separated from the first magnetic part 204. As such, a gap 506 (which, in this embodiment, is also equivalent to the valve pin travel) separates the first and second magnetic parts 204, 206. The attractive magnetic force can be viewed as acting within the gap 506 to tend to bring the first and second magnetic parts 204, 206 closer together.

FIG. 6 is a cross-sectional view of a nozzle tip component 631 in accordance with an embodiment hereof that may be used in the injection molding apparatus 100 shown in FIGS. 1, 3 and 4. In this embodiment, nozzle tip component 631 for taking nozzle 112 out-of-service includes retainer 632 for attaching to the nozzle and locking liner 640, which acts as a valve pin gripping portion of the nozzle tip component 631. When it is desirable to take a nozzle 112 out-of-service, the conventional nozzle tip of nozzle 112 is removed and replaced with retainer 632 and locking liner 640. At the nozzle tip area, tip portion 123 of valve pin 120 fits into locking liner 640. Locking liner 640 is conical in shape and has an interior surface 644 for contacting the valve pin 120 and an exterior tapered surface 642 for contacting the retainer 632. Although interior surface 644 of locking liner 640 is shown tapered in FIG. 6, in alternate embodiment interior surface 644 may define a cylindrical bore. Locking liner 640 is formed from a material that is flexible and/or thin enough to deform when retainer 632 is tightened such that locking liner 640 grips at least tip portion 123 of valve pin 120 in a friction fit. Suitable materials for the locking liner 640 include metals, such as steel and beryllium copper, as well as plastics, such as polyimide-based polymers, e.g., VESPEL. Aside from mechanical deformation characteristics for gripping the valve pin as well as sealing against leakage, locking liner 640 may desirably be made of a material having a resistance to high operating temperatures and a relative thermal expansion that accommodates the required service life of the locking liner 640. Retainer 632 has an interior tapered surface 638 that matches or corresponds to exterior tapered surface 642 of locking liner 640. In addition, retainer 632 includes an exterior surface 634 including threads 636 located to correspond with a threaded bore 637 of nozzle 112. Retainer 632 is threaded into nozzle 112 to secure locking liner 640 against nozzle 112, such that retainer 632 may be tightened against locking liner 640 to compress the locking liner 640 around valve pin 120 and thereby immobilize valve pin 120. Retainer 632 may also seal the nozzle tip area to prevent leakage/drooling in the out-of-service nozzle. Suitable materials for retainer 632 include metals, such as steel. In embodiments where retainer 632 is used to secure nozzle tip 165 during normal operation and to secure locking liner 640 in an out-of-service position, retainer 632 may made of a less thermally conductive material than nozzle tip 165, for e.g., a titanium alloy.

Figure 7:
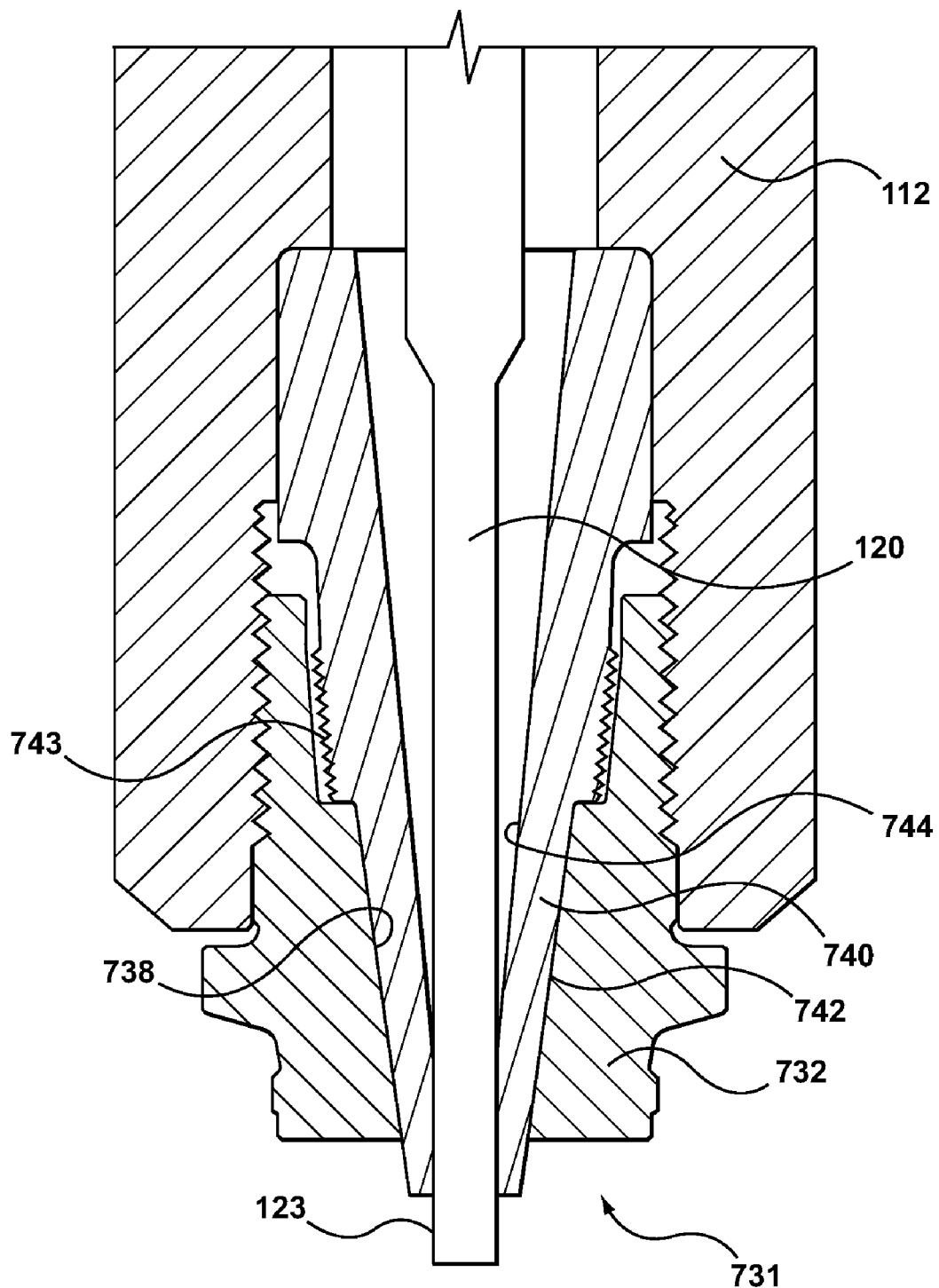
FIG. 7 is a cross-sectional view of a nozzle tip component in accordance with another embodiment.

FIG. 7 is a cross-sectional view of a nozzle tip component 731 in accordance with another embodiment hereof that may be used in the injection molding apparatus 100 shown in FIGS. 1, 3 and 4. In this embodiment, the exterior tapered surface 742 of the locking liner 740 may include one or more threads. As shown in FIG. 7, locking liner 740 has an interior surface 744 for contacting at least tip portion 123 of valve pin 120 and exterior tapered surface 742 for contacting a retainer 732. Although interior surface 744 of locking liner 740 is shown tapered in FIG. 7, in alternate embodiment interior surface 744 may define a cylindrical bore. Exterior tapered surface 742 of locking liner 740 includes threads 743, which do not engage retainer 732. Instead, a tool (not shown) with threads on an interior surface thereof may be threaded onto threads 743 of locking liner 740 to aid in removal of locking liner 740 after use. Locking liner 740 and retainer 732 cooperatively function and operate in the same way as the above-described embodiment in order to lock or hold the valve pin in an out-of-service nozzle.

Figure 8:
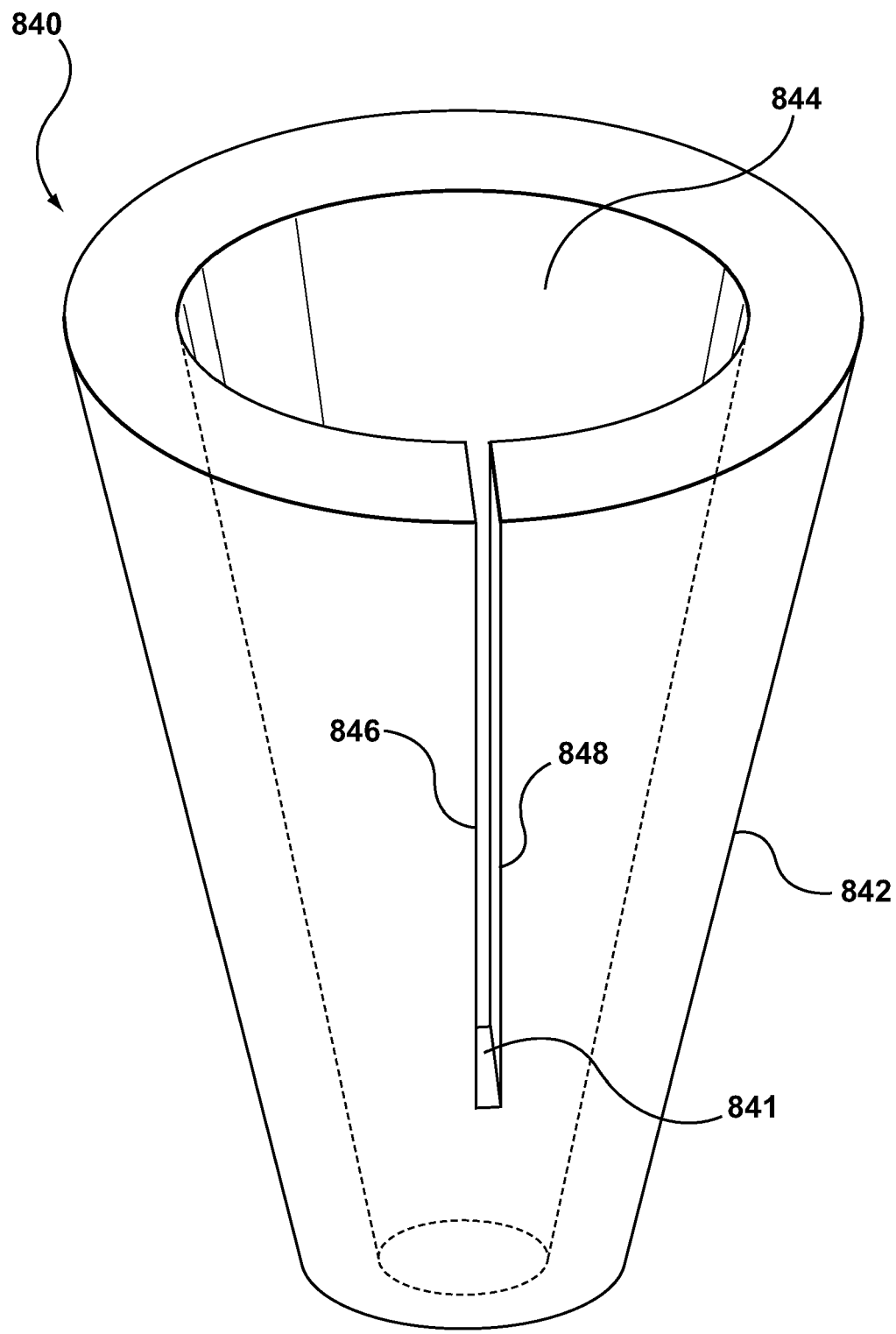
FIG. 8 is a perspective view of a locking liner having a collet-type configuration in accordance with another embodiment.

FIG. 8 is a perspective view of a locking liner 840 in accordance with another embodiment having a collet-type configuration. Locking liner 840 may be used in the injection molding apparatus 100 shown in FIGS. 1, 3 and 4 and may be adapted for use in the nozzle tip component embodiments shown in FIGS. 6 and 7. Collet-type locking liner 840 has a cone-type shape, e.g., frusto-conical, and includes slit 841 such that locking liner 840 may be compressed to close slit 841 and grip a respective valve pin. Although locking liner 840 includes only one slit 841, it should be noted that locking liners in accordance with this embodiment may contain multiple slits. Slit 841 extends a portion of the length of locking liner 840, and may extend from either the top edge of the locking liner or the bottom edge of the locking liner. In another embodiment, slit 841 may extend the entire length of locking liner 840. Slit 841 is defined by a first longitudinal surface 846 and a second longitudinal surface 848. Once in position, the locking liner 840 is compressed such that first and second longitudinal surfaces 846, 848 of slit 841 are moved toward each other/together and locking liner 840 grips the valve pin. Locking liner 840 has an interior surface 844 for contacting at least the tip portion of the valve pin (not shown) and an exterior tapered surface 842 for contacting the interior surface of the retainer, such as interior surfaces 638, 738 of retainers 632, 732, respectively. Exterior surface 842 may be smooth as shown or may include one or more threads for easy removal of the locking liner as described in the embodiment of FIG. 7. When the retainer is tightened to the nozzle, locking liner 840 is compressed thereby to grip around the valve pin in a friction fit. Once tightened, the retainer and the locking liner 840 create a sealed nozzle tip area to prevent leakage/drooling in the out-of-service nozzle.

Figure 9:
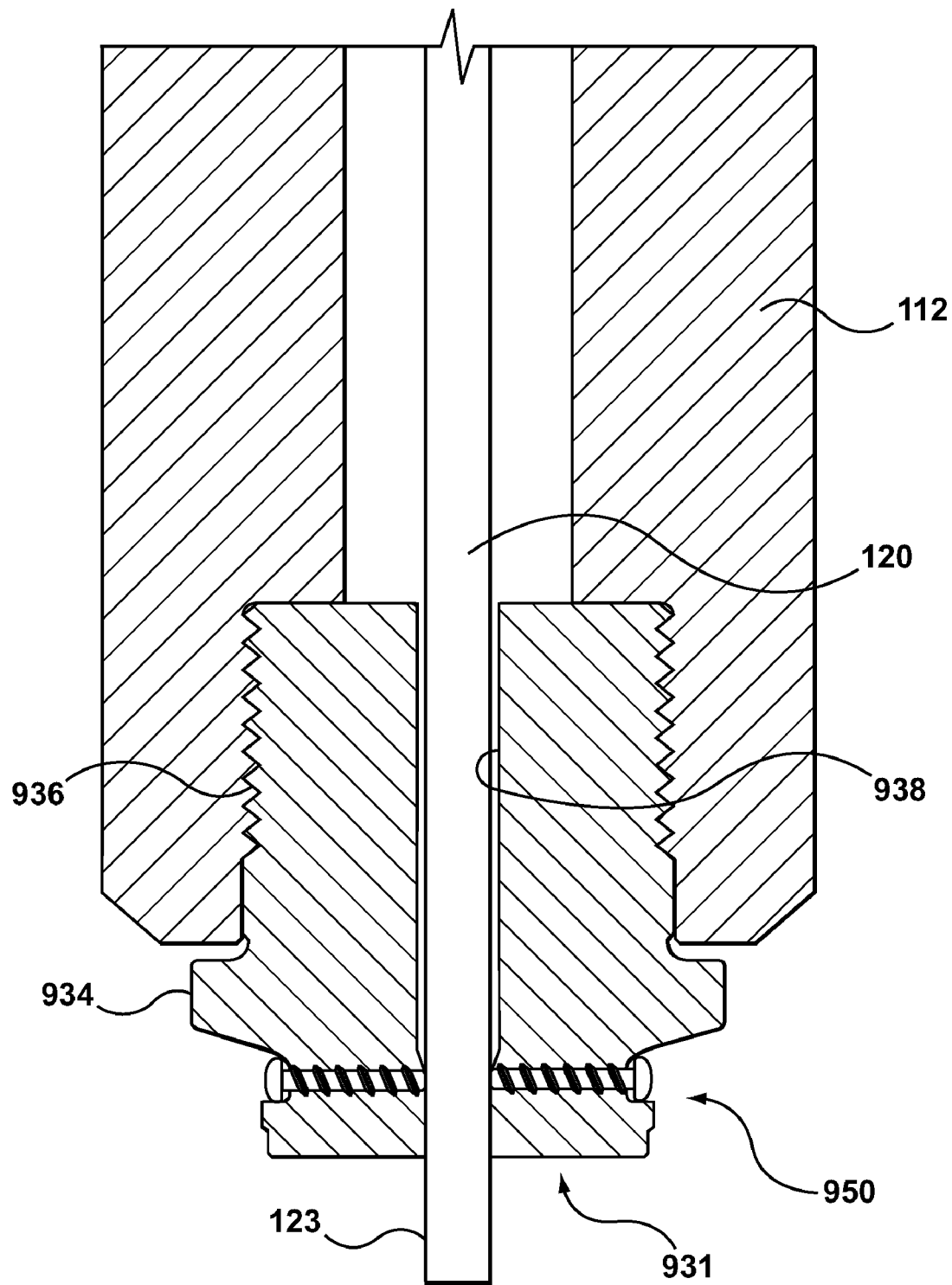
FIG. 9 is a cross-sectional view of a nozzle tip component in accordance with another embodiment.

In another embodiment illustrated in FIG. 9, the locking liner is eliminated such that nozzle tip component 931 is threadably secured to nozzle 112 and then secured against the valve pin by fasteners 950. Nozzle tip component 931 may be used in the injection molding apparatus 100 shown in FIGS. 1, 3 and 4. Nozzle tip component 931 includes an interior surface 938 for contacting at least tip portion 123 of valve pin 120 to act as a valve pin gripping portion and an exterior surface 934 including one or more threads 936. Interior surface 938 defines a cylindrical bore through nozzle tip component 931. Threads 936 may be utilized for connecting the nozzle tip component 931 to the nozzle 112. Fasteners 950 may be screwed through nozzle tip component 931, lateral or perpendicular to valve pin 120, for fixing the valve pin 120 to nozzle tip component 931 such that nozzle tip component 931 grips or otherwise immobilizes valve pin 120. Once fastened, nozzle tip component 931 locks the valve pin 120 in place. In an embodiment, nozzle tip component 931 may also create a sealed nozzle tip area to prevent drooling in the out-of-service nozzle. Fasteners 950 may be any suitable type of mechanical fastener, including but not limited to a set screw or other screw-like structure. Sealing between the valve pin 120 and the nozzle tip component 931 can be achieved by holding suitable tolerances.

Figure 10:
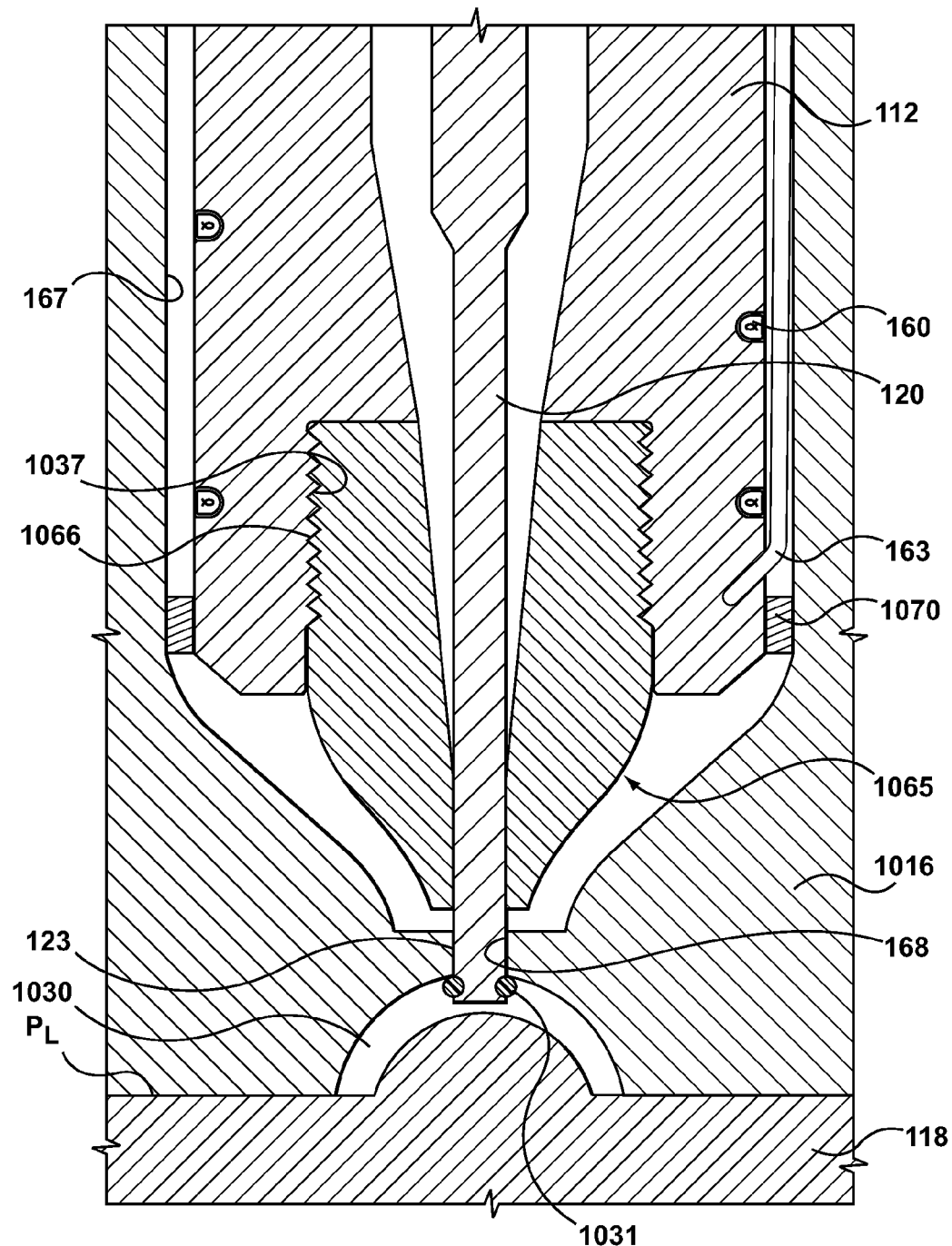
FIG. 10 is a cross-sectional view of a nozzle tip component in accordance with another embodiment.

FIG. 10 illustrates another embodiment in which a locking liner is not utilized to take nozzle 112 out-of-service. One piece nozzle tip 1065 includes threads 1066 that are received within threaded bore 1037 of nozzle 112 to attach nozzle tip 1065 thereto. A seal 1070 surrounds an upstream end of nozzle 112 and contacts a wall of well 167 in mold cavity plate 1016, which in this embodiment is shown as a single mold plate but may in other embodiments be comprised of multiple plates. Nozzle tip 1065 directs a melt stream of moldable material received from nozzle 112 during an injection cycle through mold gate 168 to mold cavity 1030, which is formed between mold cavity plate 1016 and mold core plate 118. To take nozzle 112 out-of-service as shown in FIG. 10, tip portion 123 of valve pin 120 is pulled forward to extend through mold gate 168 such that an upstream section of valve pin tip portion 123 sits within mold cavity 1030. Nozzle tip component 1031 is a C-shaped clip that is clipped or snapped onto the upstream section of tip portion 123 of valve pin 120 at a location along tip portion 123 that is positioned downstream of mold gate 168 and within mold cavity 1030. In an embodiment, valve pin 120 may include a groove (not shown) within which nozzle tip component 1031 is seated. Nozzle tip component 1031 attached to valve pin 120 in this manner is sized such that nozzle tip component 1031 will not be drawn within mold gate 168 but instead surrounds mold gate 168 to sit against mold cavity plate 1016 to prevent upstream movement of valve pin 120. Once heater 160 has been turned-off, valve pin 120 may then be held in the out-of-service position by melt frozen in the melt channel of nozzle 112. It would be understood by one of ordinary skill in the art that nozzle tip component 1031 may be installed as shown in FIG. 10 in a mold open position, i.e., when mold cavity plate 1016 and mold core plate 118 are separated along parting line $P_L$, without the necessity of removing mold cavity plate 1016. Once attached to valve pin 120, nozzle tip component 1031 decouples valve pin 120 from actuated valve pin plate 106 to prevent valve pin 120 from moving therewith. In this manner, nozzle 112 is taken out-of-service. Nozzle tip component 1031 may be any suitable type of clip, including but not limited to a circlip, a snap ring or a retainer clip. Nozzle tip component 1031 may be used in the injection molding apparatus 100 shown in FIGS. 1, 3 and 4. An advantage provided by nozzle tip component 1031 is that nozzle tip 1065 need not be removed to install nozzle tip component 1031.

Figure 11:
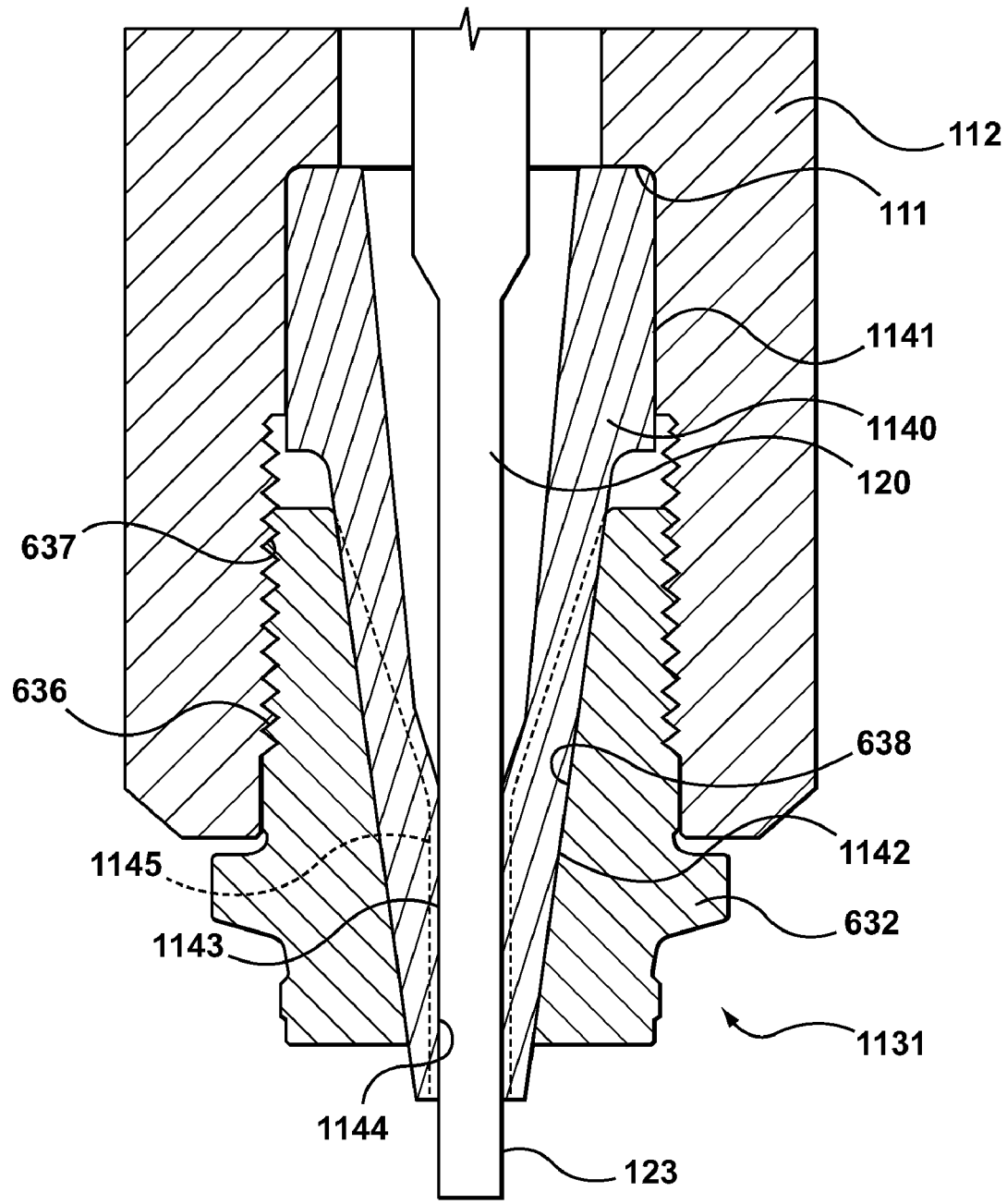
FIG. 11 is a cross-sectional view of a nozzle tip component in accordance with another embodiment.
Figure 11A:
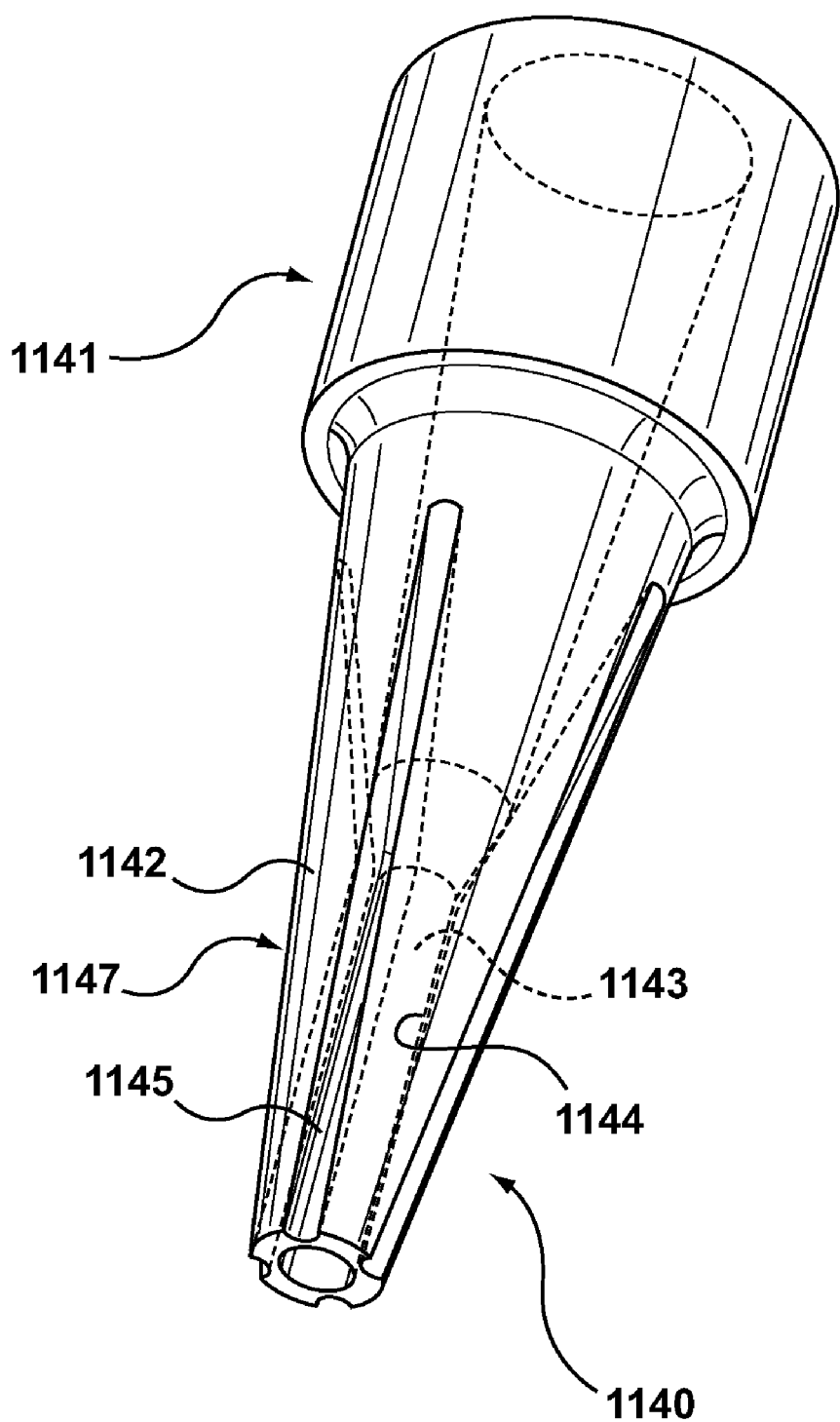
FIG. 11A is a perspective view of the nozzle tip component of FIG. 11.

FIG. 11 is a cross-sectional view of nozzle tip component 1131 in accordance with another embodiment hereof that may be used in the injection molding apparatus 100 shown in FIGS. 1, 3 and 4, with FIG. 11A being a perspective view of locking liner 1140. In this embodiment, nozzle tip component 1131 includes a retainer 632, previously described with reference to the embodiment of FIG. 6, and a locking liner 1140. In contrast to previous embodiments of nozzle tip components for taking nozzles out-of-service in which nozzle tip components 431, 631, 731, 931, and 1031 replace nozzle tip 165 and/or retainer 166 used during an injection cycle, nozzle tip component 1131 has an operating position and an out-of-service position. As such, nozzle tip component 1131 is used in place of nozzle tip 165 and retainer 166 during an injection cycle under operating conditions to direct flow from a respective nozzle 112 to a respective mold cavity 130 and is also used to take nozzle 112 out-of-service. An advantage provided by nozzle tip component 1131 is that nozzle tip component 1131 need not be disassembled to take nozzle 112 out-of-service.

Locking liner 1140 of nozzle tip component 1131 includes a cylindrical base 1141 that seats against a shoulder 111 of nozzle 112 and a substantially frusto-conical body 1147 having an interior surface 1144 for contacting valve pin 120 when nozzle tip component 1131 is in the out-of-service position and an exterior surface 1142 for contacting retainer 632. Cylindrical bore 1143 extends through each of cylindrical base 1141 and frusto-conical body 1147 of locking liner 1140 and is sized to allow valve pin 120 to slide freely therein when nozzle tip component 1131 is in an operating or injection cycle position. Frusto-conical body 1147 of locking liner 1140 includes a plurality of longitudinal channels or grooves 1145 formed within exterior surface 1142. Longitudinal channels 1145 of locking liner 1140 are sized to maintain their shape, i.e., are open, when retainer 632 is used to secure locking liner 1140 to nozzle 112 under normal or recommended torque for installation. When installed as such, nozzle tip component 1131 is in the operating position and cylindrical bore 1143 allows unobstructed movement of valve pin 120. However when nozzle 112 is to be taken out-of-service, retainer 632 of nozzle tip component 1131 may be over-torqued by at least an additional 20% over the recommended torque for installation to tighten locking liner 1140 against nozzle 112, thereby deforming or closing longitudinal channels 1145 while correspondingly compressing cylindrical bore 1143 around valve pin 120. When installed as such, nozzle tip component 1131 is in the out-of-service position wherein valve pin 120 is effectively gripped by nozzle tip component 1131. Suitable materials for locking liner 1140 include metals, such as steel, TZM (a molybdenum-based alloy), and beryllium copper, as well as plastics, such as polyimide-based polymers, e.g., VESPEL. Aside from mechanical deformation characteristics for gripping valve pin 120 as well as sealing against leakage, locking liner 1140 may desirably be made of a material having a resistance to high operating temperatures and a relative thermal expansion that accommodates expected service life. Retainer 632 may made of a less thermally conductive material than locking liner 1140, for e.g., a titanium alloy or steel.

In other embodiments, a nozzle tip component is used to grip and lock a valve pin in the closed or out-of-service position, when the valve pin is not used in conjunction with an actuated valve pin plate. For example, a group of valve pins can be individually controlled by actuators that are fed by a common fluid source, e.g., a common air line. In such case, the valve pins will operate together, much like when connected to an actuated plate, and it may be problematic to turn off the specific actuator controlling the valve pin to be taken out-of-service without turning off all the actuators. Any of the nozzle tip components described herein can be used in this situation to lock the valve pin in the out-of-service position.

In embodiments described herein, supplementary components have been omitted for clarity. For example, a designer may choose to provide many of the threaded components described with lock nuts or another mechanism to stop the threads from working free over time.

In addition, the valve pins as shown oriented in the figures are down-closed and up-open. Reverse gating (up-closed, down-open) and lateral gating (e.g., edge gating) are also possible.

Lastly, the terms fixed, connected, coupled, etc used herein do not exclude indirect connections between parts. For example, a part can be fixed to another part with any number of parts in between or none at all (i.e., directly fixed). In addition, parts described as fixed, connected, coupled, etc can also be integral, if the resulting functionality is not changed.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:
1. An injection molding apparatus, comprising:
  a valve pin actuator;
  a plurality of nozzles defining nozzle melt channels for delivering a melt stream of moldable material to respective mold gates; and
  a plurality of valve pins releasably coupled to and movable by the valve pin actuator, each valve pin extending through one of the nozzle melt channels for opening and closing a respective mold gate,
  wherein at least one nozzle includes a nozzle tip component installed for gripping a tip portion of the associated valve pin and holding the valve pin in an out-of-service position in which the valve pin decouples from the valve pin actuator for taking the at least one nozzle out-of-service.

2. The injection molding apparatus of claim 1, wherein the nozzle tip component includes a locking liner having an interior surface that circumferentially surrounds and grips the tip portion of the valve pin.

3. The injection molding apparatus of claim 2, wherein the locking liner is formed from an elastic material that is deformable around the valve pin.

4. The injection molding apparatus of claim 2, wherein the locking liner has a frusto-conical configuration with a slit extending at least a portion of a length of the locking liner.

5. The injection molding apparatus of claim 2, wherein the locking liner has an exterior surface including one or more threads.

6. The injection molding apparatus of claim 2, wherein the locking liner has a tapered exterior surface.

7. The injection molding apparatus of claim 2, wherein the nozzle tip component includes a retainer that is operable to be tightened around the locking liner.

8. The injection molding apparatus of claim 7, wherein the locking liner has a longitudinal channel in an outer surface thereof and the retainer is operable to be tightened around the locking liner to deform the longitudinal channel.

9. The injection molding apparatus of claim 7, wherein the retainer has a tapered interior surface for mating against a tapered exterior surface of the locking liner and wherein the retainer and the locking liner are longitudinally movable relative to each other for tightening the retainer around the locking liner.

10. The injection molding apparatus of claim 1, wherein the nozzle tip component includes a fastener that secures the nozzle tip component to the valve pin.

11. The injection molding apparatus of claim 1, wherein the nozzle tip component is a c-clip that is attachable around the tip portion of the valve pin.

12. A device for taking an injection molding nozzle having a valve pin out-of-service comprising:
a nozzle tip component installable on the nozzle, the nozzle tip component having a gripping portion for contacting and gripping a tip portion of the valve pin to hold the valve pin in an out-of-service position such that the valve pin is immobilized.

13. The device of claim 12, wherein the gripping portion is an interior surface of a locking liner that surrounds the tip portion of the valve pin.

14. The device of claim 13 further comprising:
a retainer for installing the locking liner to the nozzle wherein the retainer is operable to be tightened around the locking liner.

15. The device of claim 14, wherein the retainer has a tapered interior surface for mating against a tapered exterior surface of the locking liner and wherein the retainer and the locking liner are longitudinally movable relative to each other for tightening the retainer around the locking liner.

16. The device of claim 12, wherein the nozzle tip component includes a fastener that secures the nozzle tip component to the valve pin.

17. The device of claim 12, wherein the nozzle tip component is a c-clip that is attachable around the tip portion of the valve pin.

* * * * *